United States Patent
Field

[11] 4,025,810
[45] May 24, 1977

[54] LOW NOISE SYNCHONOUS MOTORS

[75] Inventor: John H. Field, Norfolk, Mass.

[73] Assignee: Sigma Instruments, Inc., Braintree, Mass.

[22] Filed: Aug. 29, 1975

[21] Appl. No.: 609,073

[52] U.S. Cl. .............................. 310/162; 310/156
[51] Int. Cl.² ...................................... H02K 19/00
[58] Field of Search ........................ 310/162–164, 310/51, 114, 49, 254, 259, 257, 258, 265, 266, 156; 318/165, 166, 184; 265/261, 264

[56] References Cited

UNITED STATES PATENTS

| | | | |
|---|---|---|---|
| 2,412,254 | 12/1946 | Edelman | 310/259 |
| 2,497,114 | 2/1950 | Curry | 310/259 |
| 2,982,872 | 5/1961 | Fredrickson | 310/163 |
| 3,206,623 | 9/1965 | Snowdon | 310/254 |
| 3,229,134 | 1/1966 | Rakula | 310/259 |
| 3,253,170 | 5/1966 | Phillips | 310/51 |
| 3,293,459 | 12/1966 | Kreuter | 310/49 |
| 3,343,014 | 9/1967 | Giles | 310/49 |
| 3,453,510 | 7/1969 | Kreuter | 310/49 |
| 3,500,081 | 3/1970 | Drejza | 310/49 |
| 3,609,430 | 9/1971 | Buffington | 310/265 |

*Primary Examiner*—R. Skudy
*Attorney, Agent, or Firm*—Toren, McGeady and Stanger

[57] ABSTRACT

Longitudinally extending radially-projecting and peripherally-spaced teeth on a stator member and rotor member of a synchronous electric motor, whose rotor member is magnetized by a permanent magnet, are skewed relative to each other. The overall peripheral distance of each tooth on one member is equal to or less than the space between the overall peripheral distances of the teeth on the other member. According to one embodiment the rotor teeth are skewed relative to the rotor axis and the stator teeth parallel thereto.

19 Claims, 7 Drawing Figures

LOW NOISE SYNCHONOUS MOTORS

BACKGROUND OF THE INVENTION

This invention relates to synchronous motors, particularly of the type wherein peripheral teeth on a rotor and magnetized by a permanent magnet move relative to radially projecting teeth on a coaxial electromagnetically energized stator.

Motors of this type are disclosed in U.S. Pat. Nos. 2,105,513, 2,105,514, and 2,589,999. In such motors, cylindrical rotors magnetized by permanent magnets carrying radially-projecting and peripherally spaced rotor teeth extending longitudinally parallel to the rotor axis rotate relative to a coaxial stator whose electrically energized stator poles carry radially-projecting and circularly-spaced stator teeth extending longitudinally parallel to the rotor axis. The magnet fields created at the teeth by the permanent magnet and the electrical signals at the stator poles move the rotor synchronously with the electrical signals. Such motors can stop at predetermined locations in response to applied input signals.

These motors, while suitable for many uses, have the disadvantage of generating undesirable noise and vibration.

An object of this invention is to improve such motors.

Another object of this invention is to reduce the noise and vibration generated by such motors while maintaining their desired characteristics.

SUMMARY OF THE INVENTION

According to a feature of the invention, the radially-projecting circularly-spaced and longitudinally-extending rotor and stator teeth are skewed relative to each other. However, the overall peripheral reach of each rotor tooth from one end of the tooth to the other is within the space between the overall peripheral reach of ajacent stator teeth.

In this context, terms such as "overall peripheral reach", "overall peripheral extent", "overall circumferential (or peripheral) dimension" with reference to the stator and rotor teeth mean the angular or peripheral dimension or extent or reach of the entire tooth from end to end when the stator or rotor are viewed from their axial ends.

According to another embodiment of the invention, each rotor tooth has an overall peripheral dimension substantially equal to the minimum spacing between the stator teeth.

According to another feature of the invention, the stator teeth are parallel to the rotor axis and the rotor teeth are skewed.

According to another feature of the invention the rotor teeth are parallel to the rotor axis and the stator teeth are skewed.

These and other features of the invention are pointed out in the claims. Other objects and advantages of the invention will become evident from the following detailed description when read in light of the accompanying drawings.

DESCRIPTION OF PREFERRED EMBODIMENTS

Figure 1:
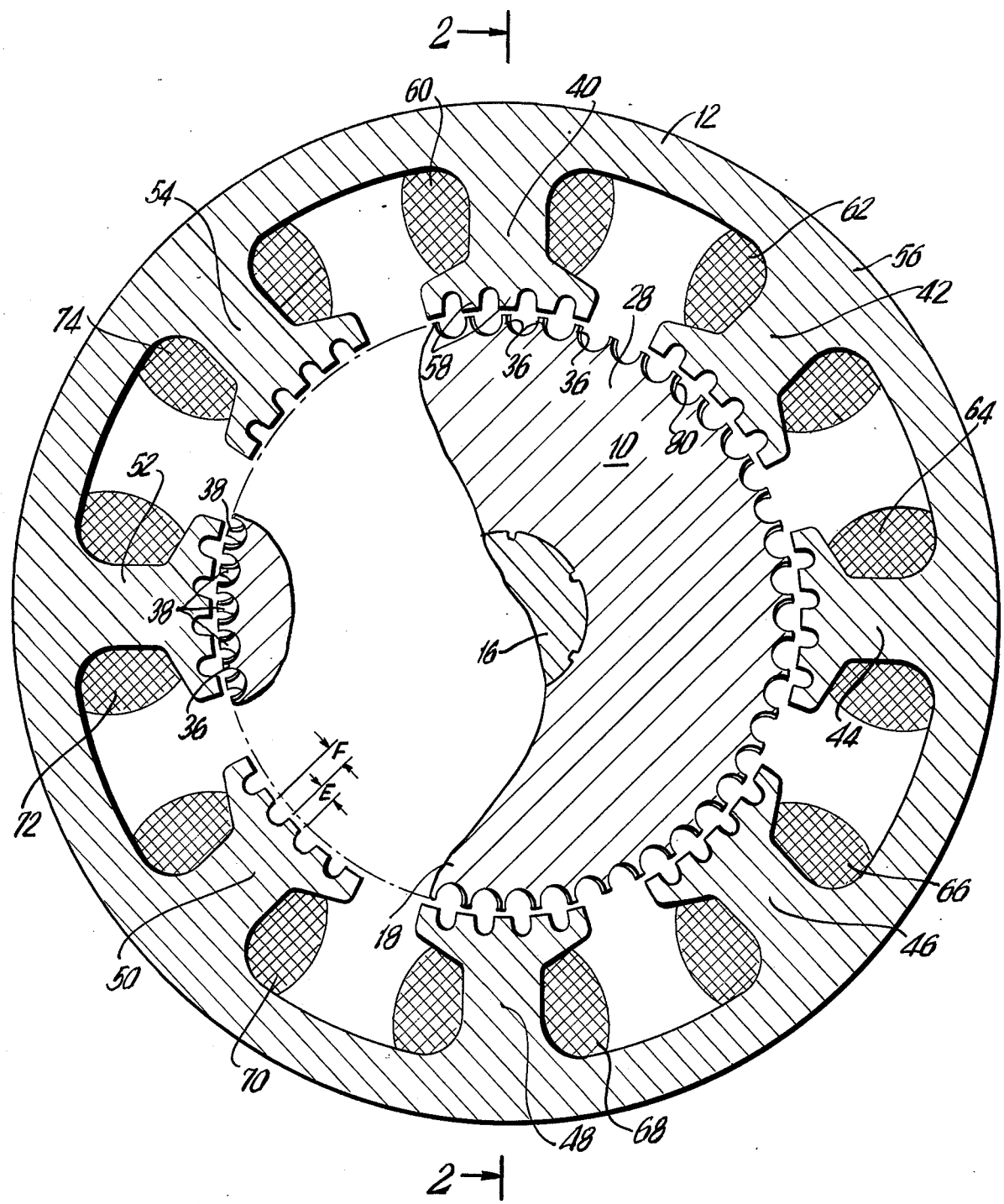
FIG. 1 is a simplified section transverse to the axis of a motor embodying features of the invention.
Figure 2:
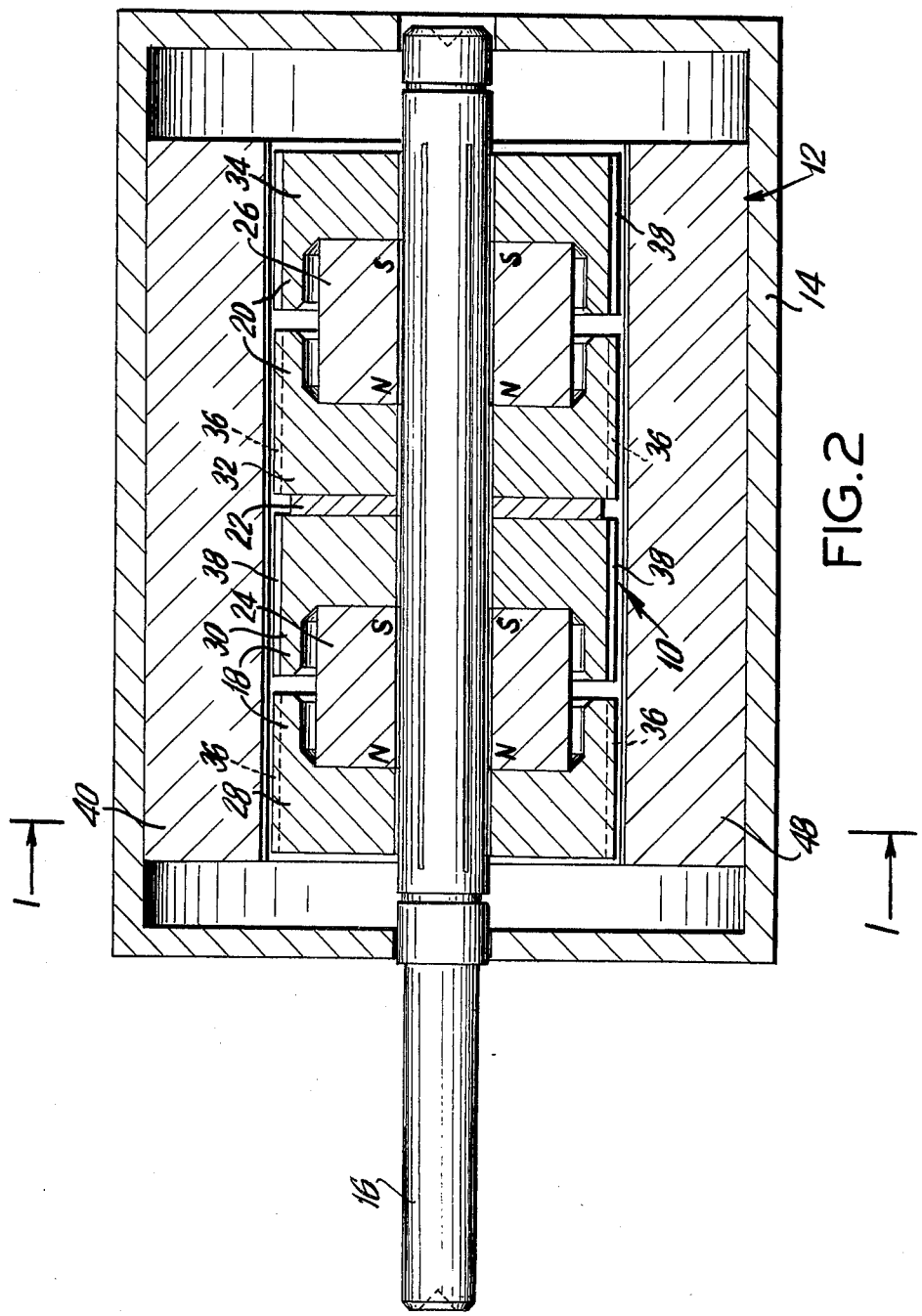
FIG. 2 is a section along the axis of the motor in FIG. 1.

In FIGS. 1 and 2, the rotor 10 rotates within a stator 12 mounted within a housing schematically shown as 14. A shaft 16 projects through the housing and is keyed to the rotor 10 for rotation therewith. Suitable bearings not shown mount the rotor 10 and the shaft 16 rotatably within the housing 14.

The rotor 10 is composed of two identical, axially displaced, rotor sections 18 and 20. A non-magnetic spacer 22 separates the sections 18 and 20 from each other. Forming sections 18 and 20 are respective permanent magnets 24 and 26 axially magnetized in the directions shown. Two cap-shaped rotor pole shoes 28, 30 and 32, 34 encapsulating the respective magnets 24 and 26 at their axial ends form front and rear rotor segments in each rotor section with their permanent magnets. The pole shoes 28, 30, 32, and 34, for simplicity, will also be referred to as rotor segments. As more particularly shown in FIG. 1, the rotor segment 28 carries 50 peripherally spaced teeth 36 projecting radially outward. The angular or peripheral pitch, that is, the angular distance between like points on adjacent rotor teeth 36 is 7.2°. As is readily ascertainable from FIG. 2, the entire segment 28 is magnetized by the permanent magnet 24 to exhibit a north polar magnetization. Although not shown, the teeth 36 are spaced about the entire periphery of the rotor segment 28. The teeth extend longitudinally along the axial direction of the rotor.

The rotor segment 30 is identical to the segment 28 and carries outwardly directed peripherally spaced radial teeth 38. However, the segment is mounted on or keyed to the shaft 16 so that the rotor teeth are angularly offset by 180° so they appear, looking axially, midway between the teeth 36. This is shown most precisely in the left hand portion of the rotor in FIG. 1. For simplicity, the rotor teeth 38 sticking out between and behind the rotor teeth 36 are not illustrated in the remainder of the rotor. However, it should be understood that rotor teeth do in fact exist in these locations behind the rotor segment 28. For simplicity, the teeth in the segments 32 and 34 of the section 20 are identified with the same reference numerals as the teeth in the segments 28 and 30 of the section 18. The sections 18 and 20 are identical.

As shown in Fig. 1, eight angularly displaced poles 40, 42, 44, 46, 48, 50, 52, and 54, project inwardly from a common circumscribing stator portion 56 to form the stator 12. The poles extend longitudinally along the entire axial dimension of the stator 12 beyond the rotor 10. Five stator pole teeth or stator teeth 58 form the inner radial ends of each pole 40 to 54. The pole teeth are formed along an imaginary cylindrical surface coaxial with the rotor and spaced slightly from the rotor teeth 36 and 38. The pole teeth are pitched at 7.2°. Thus they have the same pitch as the rotor teeth 36 and 38. The poles 40 to 54 and their respective teeth 58 are radially aligned so that the teeth on two opposite poles such as 40 and 48 can align directly with the rotor teeth 36 while the poles 44 and 52 90° therefrom are completely out of alignment with the teeth 36. The teeth 36 on the remaining 45° angularly oriented poles 42, 46, 50 and 54 are angularly arranged so that they are 90° and 270° out of phase with the angular alignment of the rotor teeth 36.

The pole teeth 58 extend longitudinally parallel to the rotor axis from one end of the rotor 10 to the other. Thus when the teeth 58 on the pole 52 and 44 are 180 degrees out of alignment with the teeth 36 of the segment 28, they are completely aligned with the teeth 38 on the segment 30. At the same time the teeth 58 on the poles 40 and 48 are completely out of alignment with the teeth 38.

Suitable windings 60, 62, 64, 66, 68, 70, 72, and 74 magnetize the poles in a sequence to cause motion of the rotor. Examples of winding connections for producing rotation appear in U.S. Pat. Nos. 3,117,268 and 2,982,872. Another example of windings and their connection appears in FIG. 3. The voltages in $CO_1$ and $CO_2$ are 90° out of phase and pulse the windings. As current flows into the plus terminals of phase A, poles 52 and 44 become north poles and poles 48 and 40 become south poles. When the current flows into the B positive terminal, poles 48 and 40 are north poles and poles 52 and 44 are south poles.

Similarly current into the plus terminal of phase C makes poles 50 and 42 north poles and poles 54 and 46 south poles when the voltage is reversed so that current flows into the plus terminal of phase D poles 46 and 54 are north poles and poles 42 and 50 are south poles. Phasing of the these currents rotates the rotor.

Figure 4:
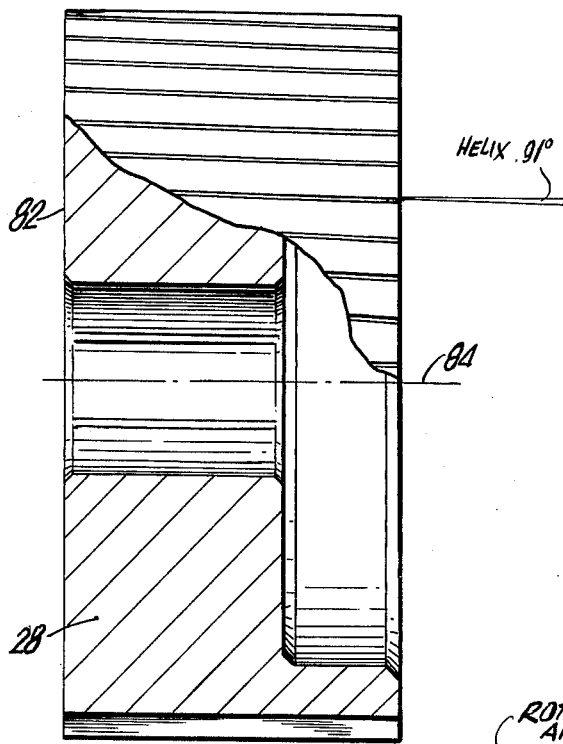
FIG. 4 is a section of one of the pole shoes in the motor of FIG. 1.

FIG. 4 illustrates the rotor segment 28. However, FIG. 4 also illustrates segments or pole shoes 30, 32 and 34, which are identical thereto. In FIG. 4, the rotor teeth are shown not to be parallel to the axis of the rotor segment but rather skewed. The skew of the rotor teeth also appears in FIG. 1 which shows the side face 80 of each tooth.

Figure 3:
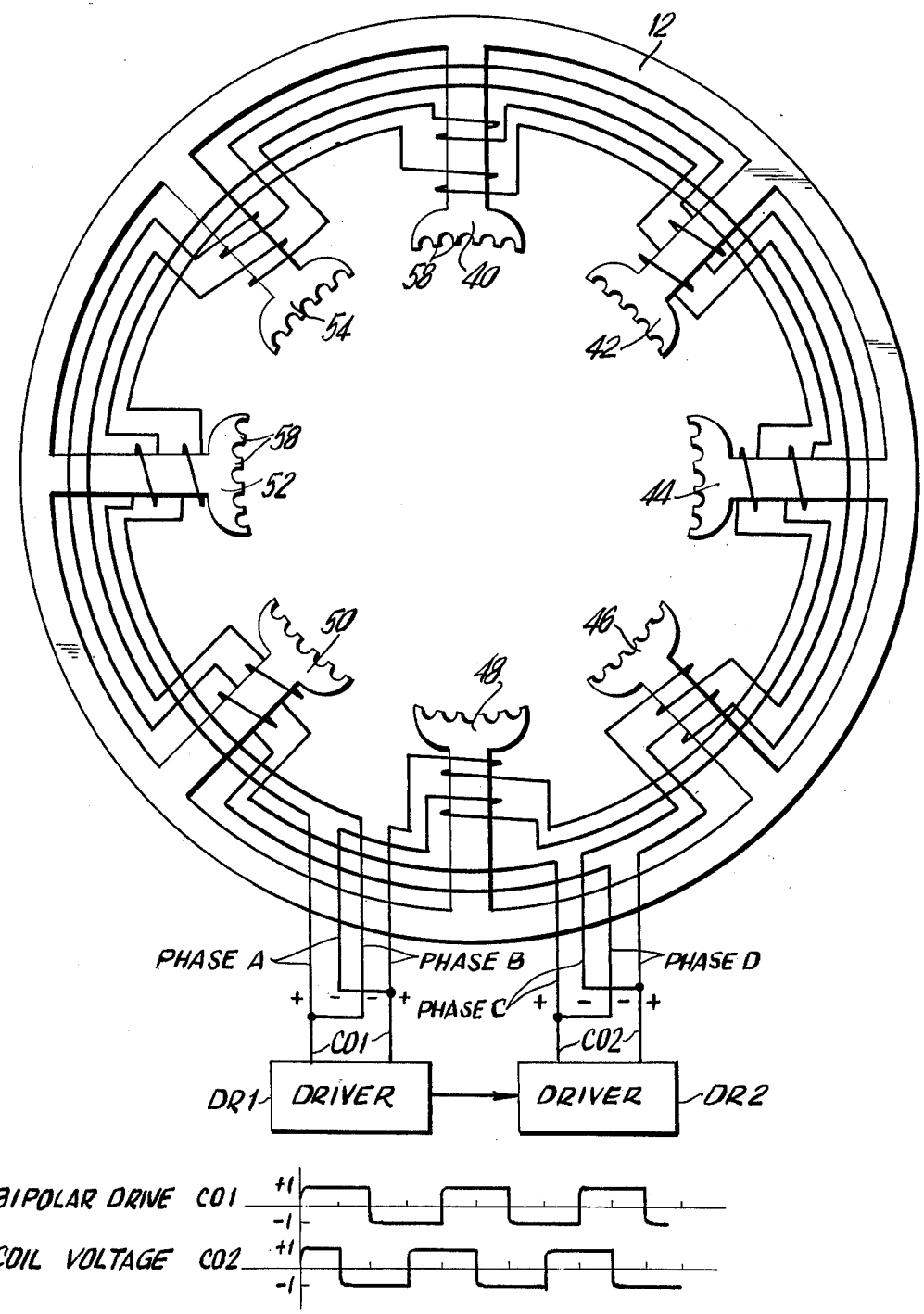
FIG. 3 is a schematic winding and energization diagram for the motor in FIG. 1.
Figure 5:
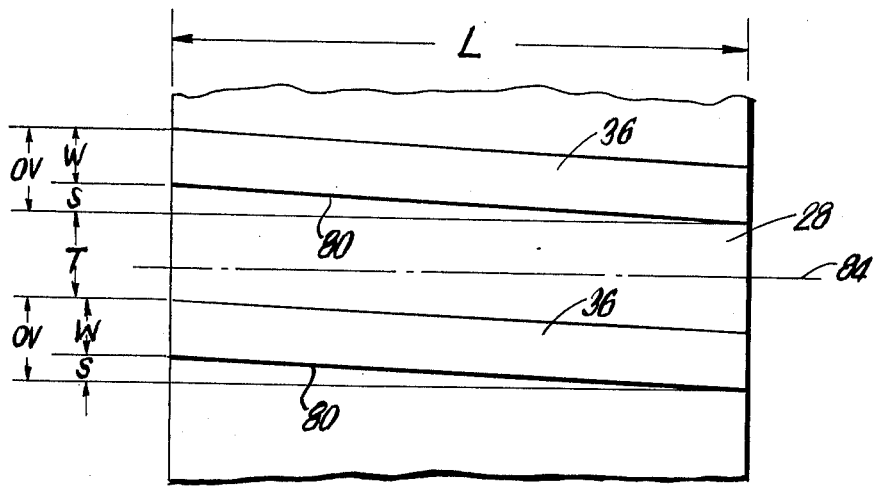
FIG. 5 is a detail of FIG. 4 showing the details of teeth in FIG. 4.

FIG. 5 illustrates two teeth of FIG. 3 and 1 in more detail. Here the skewing is exaggerated for purpose of illustration. The distances W represent the tooth width in the end plane 82 transverse to the rotor axis 84. The dimension L represents the longitudinal length of the rotor segment 28. The dimension S represents the width added to the tooth width W throughout its length due to the skewing. The overall peripheral width of each tooth as seen from one end of the segment 28 is identified as OV. All the horizontal dimension lines in FIG. 5 are parallel to the rotor axis 82. The term overall peripheral width is used synonymously with terms such as "overall angular width", "overall peripheral extent", "overall angular extent", and "overall circumferential width". The terms define the angular width of the tooth as seen from an end view from the front left edge of the tooth to the rear right edge of the tooth as seen from the left side in FIG. 5.

FIG. 5 illustrates details of two teeth 36 of FIGS. 1, 2, and 4. Here, the skewing is exaggerated for purpose of illustration. Each tooth 36 has a tooth width W in the end plane 82 transverse to the rotor axis 84. The teeth 36 has a length L parallel to the axis 84. The projection of the skewing of each tooth 36 upon the plane 82 adds a width S to the tooth width W to produce an overall peripheral width for each tooth identified as OV. All the horizontal dimension lines in FIG. 5 are parallel to the rotor axis 84 and transverse to the plane 82. The term "overall peripheral width" is used synonymously with terms such as "overall angular width", "overall peripheral extent", "overall angular extent", overall circumferential width, and maximum width. The terms define the angular width of the tooth from the front left edge of the tooth to the rear right edge of the tooth in FIG. 5, projected upon the plane 82.

The tooth separation or spacing T between the dimensions OV projected upon the plane 82 represents the minimum spacing between the teeth 36.

The stator tooth width transverse to the axis is identified as E and the stator tooth spacing is identified as F. In this embodiment, the stator teeth extend parallel to the rotor axis. However, the dimension is intended to represent the overall peripheral extent or overall angular width of the stator teeth and the dimension F is intended to represent the minimum spacing when the ends of the teeth are projected upon a plane transverse to the axis.

According to the invention, the following conditions prevail.

$$OV \leq F$$

$$T \geq E$$

That is to say the overall peripheral extent of the teeth 36 are equal to or less than the minimum projected spacing F between the teeth 58. Similarly, the minimum projected spacing T between the teeth 36 is greater or equal to the overall peripheral width of tooth 58.

These conditions prevent the alignment of the rotor teeth from overlapping two identically magnetized stator pole teeth. This prevents the rotor teeth from coupling to adjacent stator pole teeth having the same magnetic polarity. It also prevents a consequent loss of torque which would otherwise occur because it is the teeth which apply the magnetic interaction and consequent mechanical force that produces the desired torque during operation. Prevention of coupling between a single rotor tooth and two adjacent identically magnetized stator teeth is important to assure that the magnetically produced forces upon a rotor tooth do not act in opposite directions.

The stator poles and teeth are magnetized periodically and hence have a tendency to draw and repel the rotor teeth. As each rotor tooth enters the field produced by a nearby stator tooth, the motion results in greater and greater attraction until the energization is changed. The irregular forces on the rotor teeth ordinarily have the effect of accelerating and declerating the rotor with each application of current. Generally 200 current pulses in motors of the type of FIG. 1 rotate the rotor one revolution.

The skewing of the rotor teeth in the embodiments shown decreases the acceleration and deceleration inherent in unskewed rotor teeth and significantly reduces the noise and vibration involved.

According to the invention the stator teeth and rotor teeth are skewed relative to each other by at least 10 percent. That is, in FIGS. 1 to 5, the rotor teeth are skewed at least ten percent, i.e. S/W is greater or equal to 0.10 in order to obtain the desired effect.

According to one embodiment of the invention, E is 0.70 inches, F is 0.070 inches, W is 0.040 inches and S is 0.025 inches. Thus OV is 0.065 inches.

According to another embodiment of the invention, E is 0.070 inches, F is 0.070 inches, W is 0.040 inches, F is 0.018 inches and OV is 0.058 inches.

Figure 6:
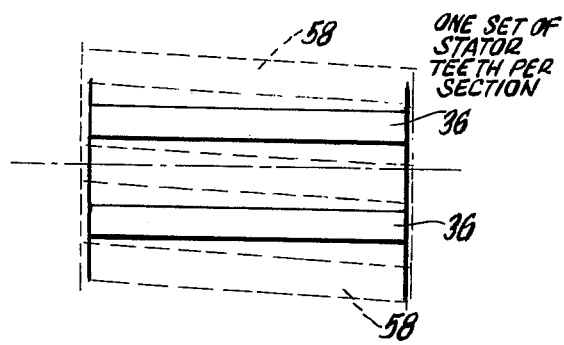
FIGS. 6 and 7 are diagrams showing other embodiments of the teeth in the motor of FIG. 1.

According to another embodiment of the invention, the stator teeth are skewed while the rotor teeth are maintained parallel to the rotor axis. Here one set of stator teeth are used per rotor section. Details of the teeth for such an arrangement are shown in FIG. 6.

Figure 7:
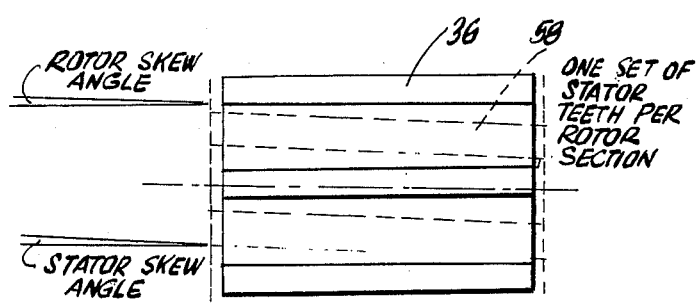

According to another embodiment of the invention, both the rotor teeth and the pole teeth are skewed relative to the rotor axis and each other. Again, one set of stator teeth is used for each rotor section. Details of the teeth for this embodiment are illustrated in FIG. 7.

While embodiments of the invention have been described in detail, it will be obvious to those skilled in the art that the invention may be embodied otherwise without departing from its spirit and scope.

What is claimed is:

1. A synchronous motor, comprising a rotor assembly including a cylindrical portion having an axis, said portion having a plurality of peripherally-spaced radially-projecting rotor teeth, and a stator assembly coaxial with said rotor assembly and having a plurality of radially projecting stator poles, said poles each having a plurality of stator teeth projecting radially to a circle coaxial with said rotor, means for electrically energizing said stator poles, permanent magnet means in one of said assemblies for establishing a magnetic field at said rotor teeth, said rotor teeth and said stator teeth each extending longitudinally along the stator poles and the rotor portion, the plurality of rotor teeth and the stator teeth being skewed relative to each other, each tooth defining a maximum peripheral width when projected upon a plane transverse to the axis and each pair teeth between them defining a minimum peripheral space when projected on the plane transverse to the axis; the maximum peripheral width of each stator tooth, skewed relative to the rotor teeth, being smaller than or equal to the minimum peripheral space between the rotor teeth and the maximum peripheral width of each rotor tooth, skewed relative to the stator teeth, being smaller than or equal to the minimum peripheral space on the stator.

2. A motor as in claim 1, wherein one of said plurality of teeth is parallel to said axis.

3. A motor as in claim 2, wherein the rotor teeth are skewed relative to the axis and the stator teeth are parallel to the axis.

4. A motor as in claim 2, wherein the stator teeth are skewed relative to the axis and the rotor teeth are parallel to the axis.

5. A motor as in claim 1, wherein the rotor and stator teeth are skewed relative to the axis.

6. A motor as in claim 1 wherein the rotor portion includes two axially displaced segments having separate ones of the rotor teeth and oppositely magnetized by said permanent magnet means, the teeth on one segment being angularly displaced relative to the teeth on the other by one half tooth pitch.

7. A motor as in claim 6, wherein one of said pluralities of teeth is parallel to said axis.

8. A motor as in claim 6, wherein the rotor teeth are skewed relative to the axis and the stator teeth are parallel to the axis.

9. A motor as in claim 6 wherein the stator teeth are skewed relative to the axis and the rotor teeth are parallel to the axis.

10. A motor as in claim 6, wherein the rotor and stator teeth are skewed relative to the axis.

11. A motor as in claim 6, wherein said rotor portion includes second permanent magnet means and two additional axially displaced segments, axially displaced relative to the first two segments each additional segment having rotor teeth and oppositely magnetized by said second permanent magnet means, the teeth on one additional segment being angularly displaced relative to the teeth on the other by one half tooth pitch, within said two additional segments, each tooth defining a maximum peripheral width when projected upon a plane transverse to the axis and pairs of adjacent teeth defining a minimum peripheral space between them, the maximum peripheral width of each tooth on the stator being smaller than or equal to the minimum peripheral width on the rotor and the maximum peripheral space of each tooth on the rotor being smaller than or equal to the minimum peripheral space on the stator.

12. A motor as in claim 11, wherein one of said pluralities of teeth is parallel to said axis.

13. A motor as in claim 3, wherein the rotor teeth each have a basic width within a plane transverse to the axis and an additional width is projected from the remainder of the tooth onto the plane to establish the maximum peripheral width, the additional width being greater than 10% of the basic width.

14. A motor as in claim 3, wherein the rotor teeth each have a basic width within a plane transverse to the axis and an additional width is projected from the remainder of the tooth onto the plane to establish the maximum peripheral width, the additional width being 45% the basic width.

15. A motor as in claim 1, wherein said teeth on said stator poles include peripherally adjacent teeth and said means for energizing said poles energize the poles so that a plurality of teeth on each pole exhibit a polarity the same as the polarity of the peripherally adjacent teeth.

16. A motor as in claim 1, wherein said rotor teeth includes peripherally adjacent rotor teeth and said permanent magnet means causes peripherally adjacent rotor teeth to exhibit the same polarity.

17. A motor as in claim 1, wherein said permanent magnet means is mounted on the rotor assembly.

18. A motor as in claim 6, wherein said permanent magnet means is mounted on the rotor portion.

19. A motor as in claim 11, wherein both permanet magnet means are mounted on the rotor assembly.

* * * * *